July 2, 1935.   R. M. DUGDALE   2,006,856
ADDRESSING MACHINE
Filed Aug. 25, 1933    7 Sheets-Sheet 1

Inventor,
Richard M. Dugdale,
by Roberts, Cushman & Woodbury
Att'ys.

July 2, 1935.  R. M. DUGDALE  2,006,856
ADDRESSING MACHINE
Filed Aug. 25, 1933  7 Sheets-Sheet 2

Inventor,
Richard M. Dugdale,
by Roberts, Cushman & Woodbury
Attys.

Inventor,
Richard M. Dugdale,

July 2, 1935.  R. M. DUGDALE  2,006,856
ADDRESSING MACHINE
Filed Aug. 25, 1933   7 Sheets-Sheet 5

Inventor,
Richard M. Dugdale,
by Roberts, Cushman & Woodberry
Att'ys.

July 2, 1935.  R. M. DUGDALE  2,006,856
ADDRESSING MACHINE
Filed Aug. 25, 1933  7 Sheets-Sheet 7

Inventor
Richard M. Dugdale
by Roberts, Cushman & Woodbury,
Attys.

Patented July 2, 1935

2,006,856

UNITED STATES PATENT OFFICE 2,006,856

ADDRESSING MACHINE

Richard M. Dugdale, Dedham, Mass., assignor to Farrington Manufacturing Company, Boston, Mass., a corporation of Massachusetts Application August 25, 1933, Serial No. 686,835

46 Claims. (Cl. 101—274)

This invention relates to the art of printing from individual plates of the kind commonly supplied to charge customers and/or suitable for addressing bills, correspondence, or the like. Relatively large numbers of these plates may be provided for use in one or in a plurality of printing devices and obviously some of the plates may be used only occasionally while others are used more frequently. While it is most important that the printing be clearly legible, it is also highly desirable that the individual plates be as simple and as inexpensive to manufacture as is consistent with efficient operation in the various printing devices in which they may be used. It is customary to make the plates of sheet metal and to form the type as embossments thereon. This invention also provides for the use of a stencil plate of any approved form as for example a plate comprising a cardboard frame and a sheet of stencil material extending across the window in the frame. In some instances, the type characters may have imperfections therein as by being of different heights or a plate may have become bent or otherwise distorted or deformed, all of which adds to the difficulty of obtaining a legible and uniform impression and/or of holding a plate from shifting or other movement during printing.

In some aspects the present invention relates to a printing device adapted to permit rapid insertion and removal of these plates while providing for securely holding even the most simple and therefore inexpensive forms of plates fixed in proper position during printing. Other aspects pertain to improvements in the principle and mode of operation of a pressure member, as a roller, to cause the latter to bear with a yielding and yet with a substantially constant and unvarying pressure as it is traversed during printing, mechanism being provided to permit the roller to tilt longitudinally along its axis of rotation and also to provide for bodily movement of the roller in the direction of a diameter thereof.

The invention also contemplates improvements generally in the construction and relative arrangement of parts to produce a neat, compact and preferably relatively low unit of the portable type in which the operating parts are enclosed and so disposed as not to obstruct the view or otherwise inconvenience a person using the device. Certain features of the invention reside in improvements which make it feasible to arrange the actuating member at one side of the device where this member is readily accessible for convenient operation and yet does not require an operator to place his hand in a position where it may obscure his view or interfere with close observation of sheets or other material being printed. Moreover, these improvements permit the various operating parts to be readily accessible for inspection and repair.

Apparatus according to the present invention may comprise opposed members such as an upper member or head and a lower member which may be in the form of a base or table; these members having a space therebetween to receive the sheet or other material to be printed. Preferably the space between these members is open on three sides to facilitate insertion of the material to be printed. The ink ribbon and its feeding mechanism together with the plate-holding device may be mounted on the upper of the opposed members and enclosed in an upper housing so that a run of the ink ribbon and the plate-holding device when in normal operating position are disposed in superposed relation between the opposed members. Preferably the plate-holding device is movable for transferring a plate between this normal operating position and a position to one side of the upper member or to one side of the ink-ribbon to facilitate insertion and removal of plates. The upper housing may be attached to the frame of the upper member so as to be removable for inspection or repair of parts enclosed thereby. The lower of the opposed members may comprise a housing, the top wall of which serves as a table to receive material to be printed. The pressure member or roller and the operating mechanism therefor may be enclosed in this lower housing, preferably in such a manner that they are readily accessible from the open underside thereof.

The apparatus selected for illustration in Figs. 1 to 16 comprises a base in the form of a flat table portion 10 having its outer edges rounded and merging smoothly into a substantially continuous depending skirt 11 to provide an enclosure or lower housing adapted to receive and support some of the operating mechanism. The apparatus may be supported by means of legs 12 affixed at convenient points to the under side of the table 10, preferably relatively close to the depending skirt. These legs are fitted at their lower ends with pads 13 of rubber or other suitable material adapted to rest firmly on a finished surface without damaging the latter. The legs are of sufficient length to cause the pads to project slightly below the skirt so that the latter does not engage the surface upon which the apparatus is supported. Hence the lower marginal portions of this skirt may be flared or rounded outwardly and the lower edges thereof may be straight or may be given any desired curved or irregular contour to add to the appearance and attractiveness of the device. Opposite walls of the skirt may have openings 14 therein to provide hand holes to facilitate carrying and handling of the device.

The pressure member is in the form of a roller 16 (Fig. 9) having large journals 17 and 17' immediately adjacent the ends thereof and smaller journals 18 and 18' projecting outwardly from the larger journals, all of the journals being coaxial with the roller. During the printing operation this roller projects through and traverses a slot 19 in the table 10; at other times this roller is disposed below the top surface of the table. The large journals of the roller ride in slots 21 and 21' extending longitudinally in the flanges of an upwardly facing substantially horizontally disposed channel 22. The slotted flanges of this channel thus serve as guides for the roller. In order to provide a channel of sufficient size to assure a rugged and yet compact construction for these guides and also to provide for tilting of the roller transversely of its axis of rotation about an axis relatively close thereto, the end portions of the channel on the side of the web thereof are cut away to receive bridge pieces 23 and 23' which are secured to opposite flanges. The channel is supported at its ends by headed pins or screws 24 and 24' depending from the table 10 and extending loosely through apertures provided in the bridge pieces. Springs 26 and 26' are disposed about these screws and seat against the heads thereof and against the bridge pieces so as to be effective yieldably to urge the channel and the roller guided thereby upwardly. The free upper edges of the flanges of the channel are also cut away at the ends thereof, as indicated at 27 and 27', to permit the intervening or intermediate portions of each flange to move freely into and out of the slot 19 in the table, while upward movement of the channel and likewise of the roller is effectively limited by engagement of the extreme or cut-away ends 27 and 27' of the flanges with the under side of the table.

Figure 9:
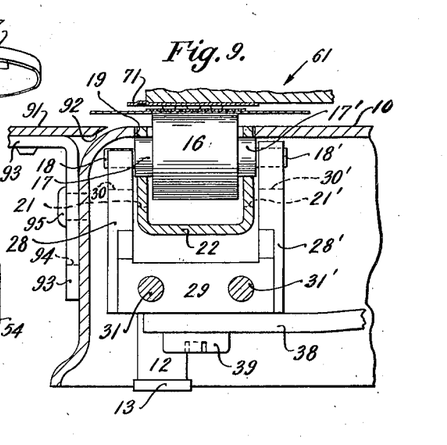
Fig. 9 is a section on the line 9—9 of Fig. 8.

The large journals of the roller are retained in the guiding slots 21 and 21' and motion is imparted to the roller to cause it to traverse the slot 19 by means of a pusher comprising substantially triangular plates 28 and 28' spaced to embrace the channel 22 and secured at their lower ends to a slidable block 29. These plates have open ended substantially vertical and aligned slots 30 and 30' at the upper ends which receive and guide the smaller journals of the roller. The block 29 has transversely extending parallel bores or holes through which supporting rods or guides 31 and 31' extend and on which the pusher is slidably mounted. These rods are spaced on either side of screws 24 and 24' parallel to the sides of the channel and are secured at their ends in blocks 32 and 32' which are affixed to the side members 33 and 33' attached to the under side of the table 10.

The side members 33 and 33' and a transverse member 34 (Fig. 6) extending between and secured to these side members constitute a removable frame which carries the pusher and the operating mechanism therefor and thus provides for inserting and removing these parts as an assembled unit. The transverse member 34 has an enlargement 36 provided with a relatively large lower surface 37 which is substantially coplanar with the lower surface of the sliding block 29. A lever 38 is pivotally mounted to swing over this surface 37 by means of the attaching screw 39. The longer arm of the lever is connected to the under side of the sliding block by a screw 41 carried thereby and working in a slot 42 in the lever. Thus the under surface of block 29 and the surface 37 assist materially in guiding the lever and in preventing binding or rubbing such as might otherwise be caused by slight twisting movement thereof. A coil spring 43 is connected to a fixed part, preferably on the removable frame as to the side member 33' and to the lever between the slotted end and the pivotal mounting thereof for holding this member normally in the position shown in Fig. 6 although obviously this spring may be connected otherwise, as to the other side member 33 and to the lever on the other side of its fulcrum.

The shorter arm of lever 38 projects beyond the surface 37 and works in a slot 44 in a link 46 which is pivotally connected to a crank arm 47 fast on a rotary sleeve 48. This sleeve is mounted to rotate on a stub shaft 49 having a reduced end portion 51 which extends through the transverse member 34 in threaded engagement therewith and receives a nut 52 by which this stub shaft is securely locked in position. The rotary sleeve extends beyond the free end of this stub shaft freely through a hole provided in the adjacent skirt portion of the housing. An operating member or lever 53 has an enlargement or boss 54 at one end which fits over the projecting end of the rotary sleeve and is detachably connected thereto in any approved manner, preferably by means of a removable pin 56 which is inserted through registering apertures in these parts. The free end of this lever is turned upwardly and has affixed thereto a substantially convex member or handle 57 adapted to manual application of downward pressure.

The ribbon feeding mechanism and the plate holder are carried by a frame indicated generally at 61 and mounted upon the upper surface or table portion of the lower housing between the slot 19 and the operating lever 53. The ribbon feeding mechanism comprises the take-up and let-off spools 62 and 63 disposed adjacent each other above the slot 19.

The plate-holding device comprises a pair of parallel bars 64 and 64' of rectangular section mounted to slide in guide passages formed in the frame 61, these passages communicating along their under sides with slots through which reduced portions or ribs 66 and 66' formed on the lower sides of the bars may project through these openings and be flush with adjacent portions of the frame. The portions of these bars which extend above the slot 19 in the table carry inwardly directed horizontal flanges 65 and 65' which have depressions 67 (Fig. 13) corresponding to the size of plate to be used and adapted to fit snugly about the latter. At the outer ends of the depressions the bars are equipped with inclined abutments or ramps 68 and 68' and the upper adjacent edges of the bars are likewise beveled or inclined toward the depressions as indicated at 69 and 69' so that a plate may not remain lodged in an inclined or other position to interfere with proper operation. This considerably facilitates and expedites the insertion of plates such as the plate 71 (Fig. 7) for with this construction it is assured that if a plate is placed approximately between the bars 64 and 64' such plate will drop automatically into the depressions provided therefor. With this arrangement it also becomes feasible to use flat plates of the most simple and therefore inexpensive construction.

The ends of the bars 64 and 64' remote from the plate-holding portion thereof project through the passages in the frame and are maintained in parallel relation by a rigid connection in the form of a strap 72 secured to these ends and extending upwardly across a central vertical rib or wall 73 and riding upon the flat upper surface of the latter. Adjustable abutments in the form of screws 74 and 74' are mounted in a transverse wall 76 of the frame and positioned to engage this strap for limiting outward movement of the bars 64 and 64'. An upper housing or cover 77 is provided for enclosing this portion of the apparatus. This housing is attached at one end beyond the travel of strap 72 to the central vertical wall 73 and at the other end to a similar wall 78 extending between the spools of the ribbon feeding mechanism. The housing may be slotted to permit the peripheries of one or both of the ribbon spools to project therethrough to provide for manual operation of this feeding mechanism. A handle 70 may also be attached to the plate carrying end of one of the bars 64 and arranged to extend outside this housing beneath the lower edge thereof. The ribbon from the spools 62 and 63 passes downwardly around the frame across the lower sides of the bars 64 and 64' and lengthwise above the slot 19 in the table.

A material guiding shoe 81 is attached to a rod 82 which is slidable in a transverse passage in the frame 61. This frame is secured to the table 10 only at the end remote from the slot 19, the under side of this frame being spaced above the table for a considerable distance from this slot to provide for insertion of material to be printed as clearly shown in Fig. 3. A material guide 83 in the form of a flat strip extends across the table beneath this raised portion of the frame and has upstanding raised ends 84 and 84' by means of which it may be moved to the desired position. On each side of the frame this guide carries vertical flanges or walls 86 and 86' which fit against the straight side walls of the base of the frame and assist in holding the guide properly in position. This guide also has depending lugs 87 and 87' which are received in parallel slots 88 and 88' in the table. Leaf springs 89 and 89' carried by these lugs bear upwardly against the under side of the table to restrain movement of the guide. The parallel slots also cooperate to maintain the guide in proper position. Preferably these slots are located beneath the cover or upper housing 77.

Figures 11, 12:
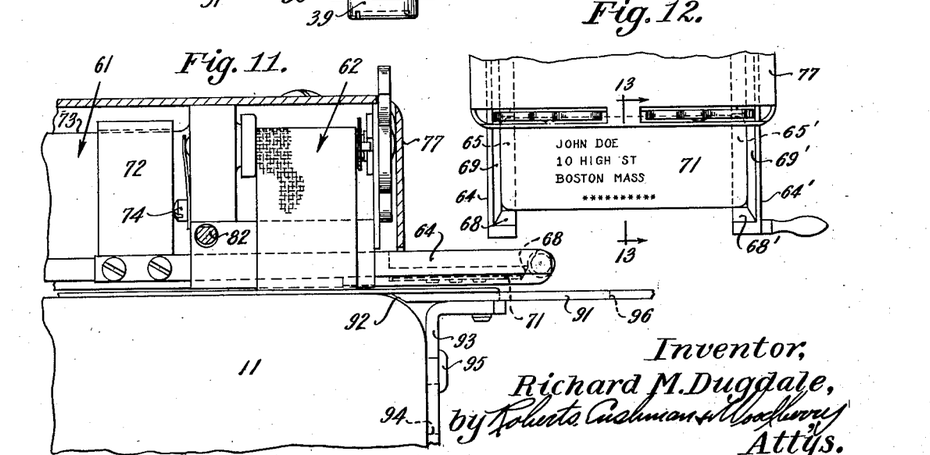
Fig. 11 is a side elevation partly in section on the line 11—11 of Fig. 1, showing the plate-carrier in its extended position.
Fig. 12 is a fragmentary plan of the plate-carrier and a printing plate retained thereby.
Figure 13:
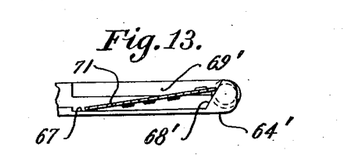
Fig. 13 is a section on the line 13—13 of Fig. 12, showing the printing plate approaching its ultimate position in the plate-carrier.
Figure 14:
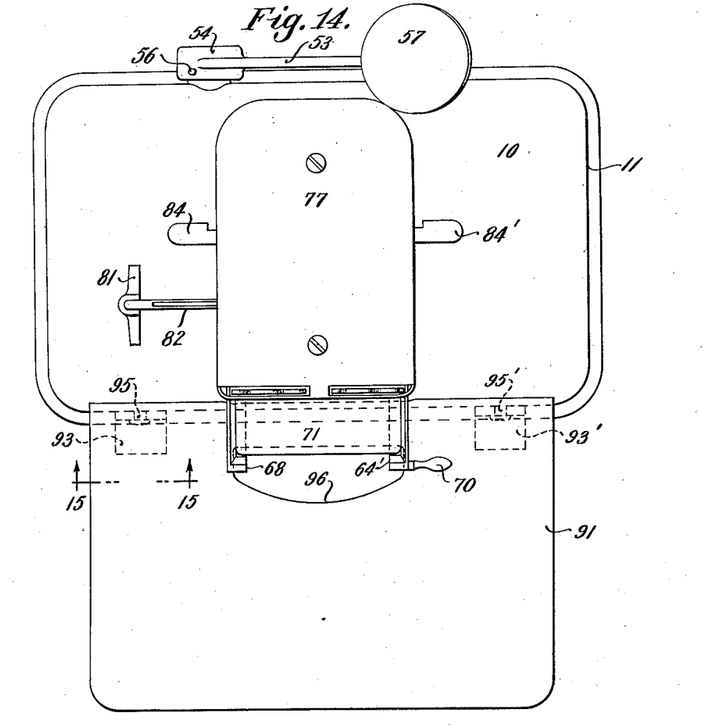
Fig. 14 is a top plan view of the machine with the shelf attached.
Figure 15:
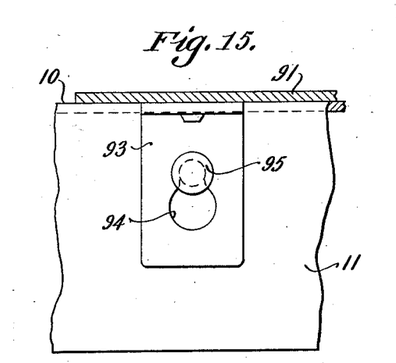
Fig. 15 is a section along the line 15—15 of Fig. 14.
Figure 16:
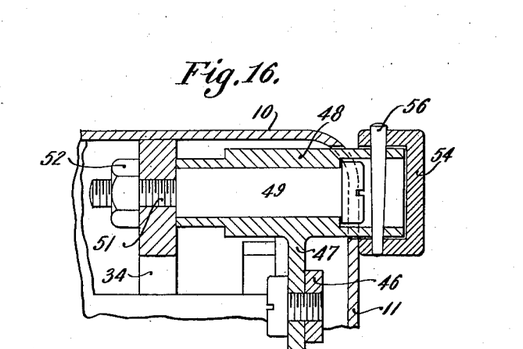
Fig. 16 is a section along the line 16—16 of Fig. 6 with the actuating lever depressed.
Figure 17:
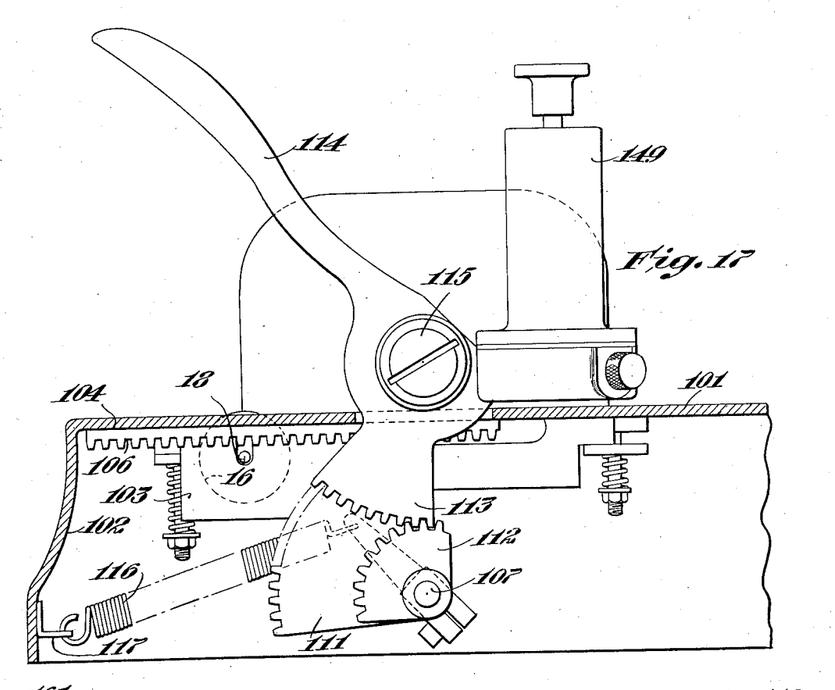
Fig. 17 is a side elevation with parts omitted and broken away illustrating a modified apparatus embodying features of the present invention.
Figure 18:
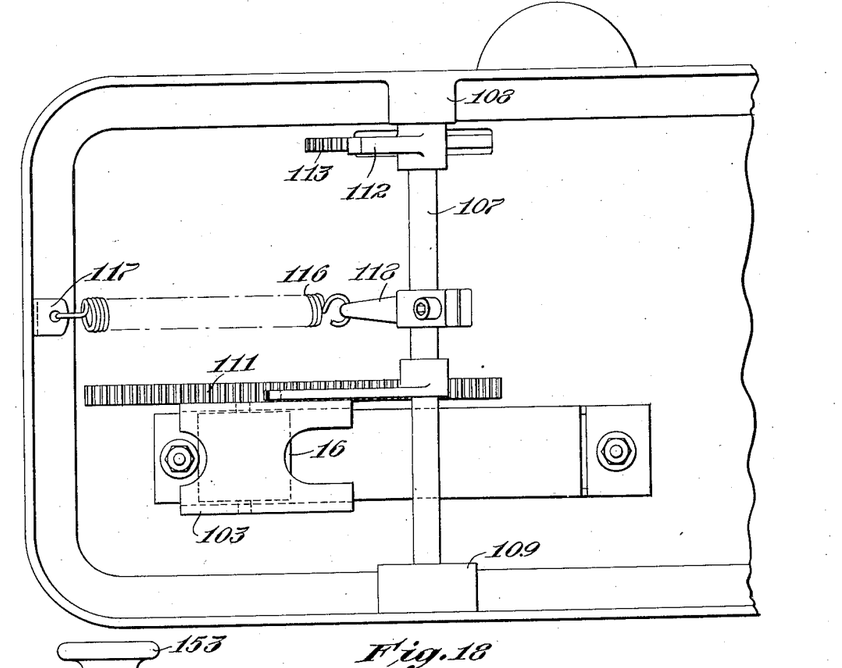
Fig. 18 is a bottom plan view with parts omitted and broken away of the device shown in Fig. 17.

A shelf 91 in the form of a rectangular plate has one of its longitudinal edges beveled on the under side as indicated at 92, Fig. 11, to fit closely adjacent the downwardly curved outer edge of the table portion 10 of the lower housing. This shelf carries on its under side angle brackets 93 and 93' the depending arms of which are slotted vertically with the lower ends of the slots enlarged as indicated at 94, Fig. 15, to fit over the outer ends of headed pins 95 and 95' affixed to the skirt portion 11 in positions to register with the slots. An elongate opening 96 is formed in this plate and provides a hand hole for applying and removing the same. Preferably this hand hole is so located as to lie directly beneath the outer edge of a plate 71 (Fig. 14) when the latter is in a position for transfer. When arranged in this way the hand hole provides an opening along the outer edge of the plate 71 in which the fingers of an operator may extend as a plate is being inserted or removed, thus permitting more accurate placing of the plates in the holder and at the same time providing a relatively large surface coplanar with the top surface of the table portion 10 and adapted to cooperate therewith for supporting material to be printed. These features also contribute to the compactness of the device as a whole. It will be understood that the shelf is detachably held in position on the lower housing by the heads of pins 95 and 95' engaging the brackets along the reduced upper ends of the slots therein and that removal is effected by raising the shelf, as by grasping the latter through the hand hole, to raise the brackets sufficiently to permit the heads of the pins to pass through the enlarged lower ends of the slots.

Figure 1:
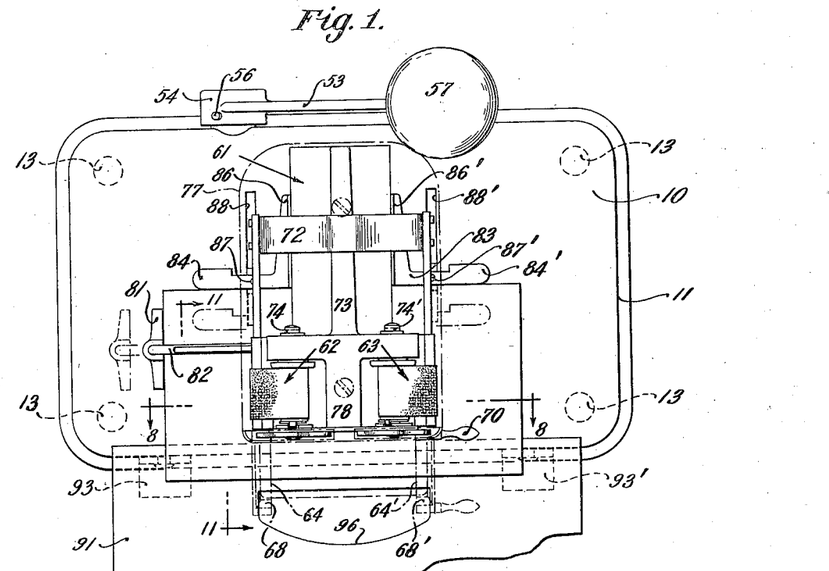
Fig. 1 is a plan view of the machine with its cover removed.
Figure 2:
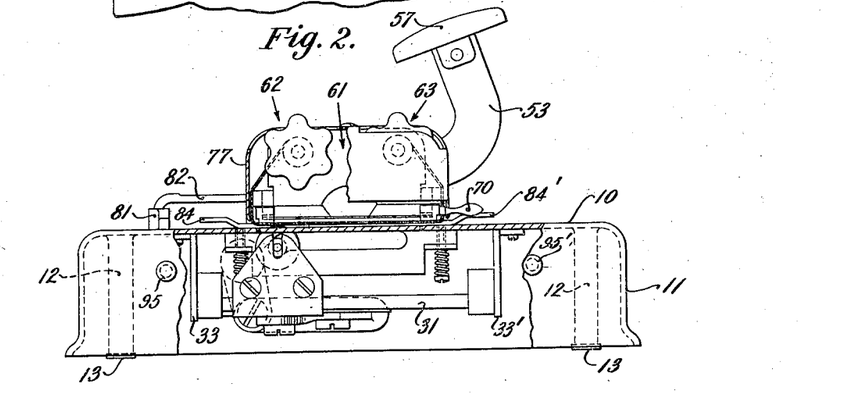
Fig. 2 is a front elevation with the shelf removed and with parts of the cover and casing broken away to disclose the enclosed mechanism.
Figure 3:
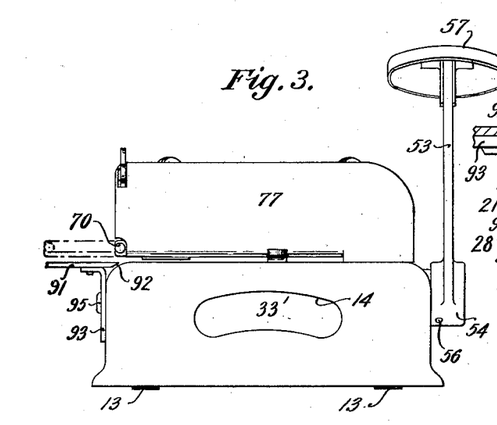
Fig. 3 is a side elevation of a detail of construction.
Figure 4:
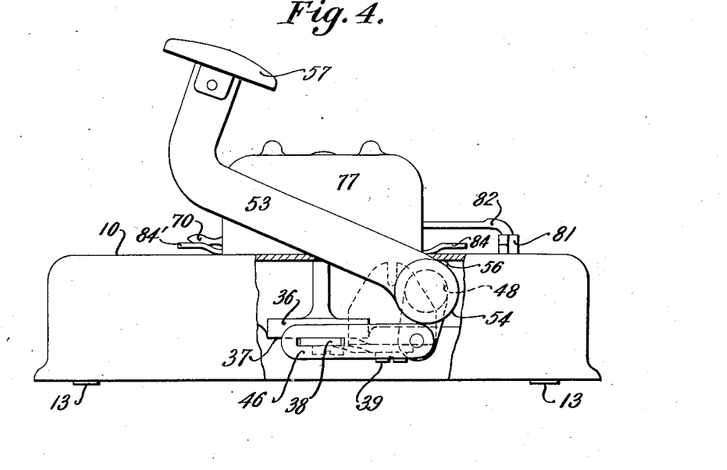
Fig. 4 is a rear elevation showing the actuating mechanism in normal or inactive position.
Figure 5:
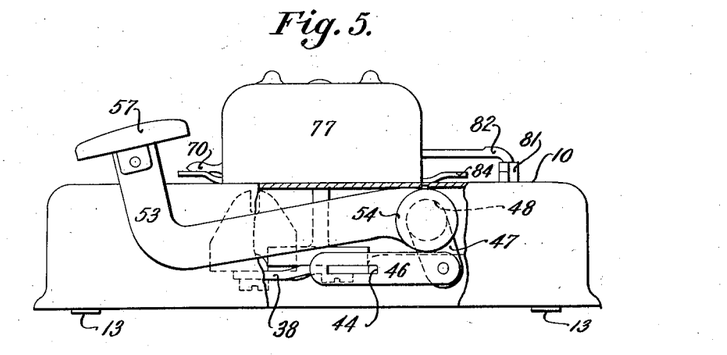
Fig. 5 is a view like Fig. 4 showing the actuating parts in advanced printing position.
Figure 6:
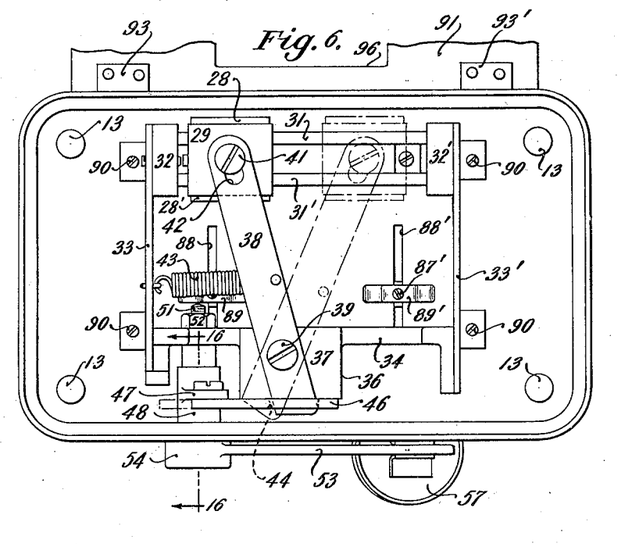
Fig. 6 is a bottom plan view.
Figure 7:
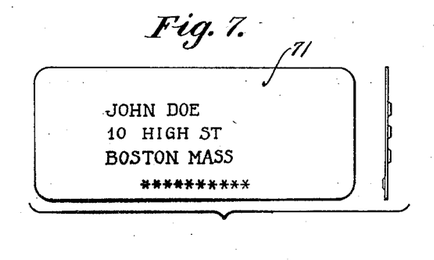
Fig. 7 shows the printing plate in plan and side elevation.
Figure 8:
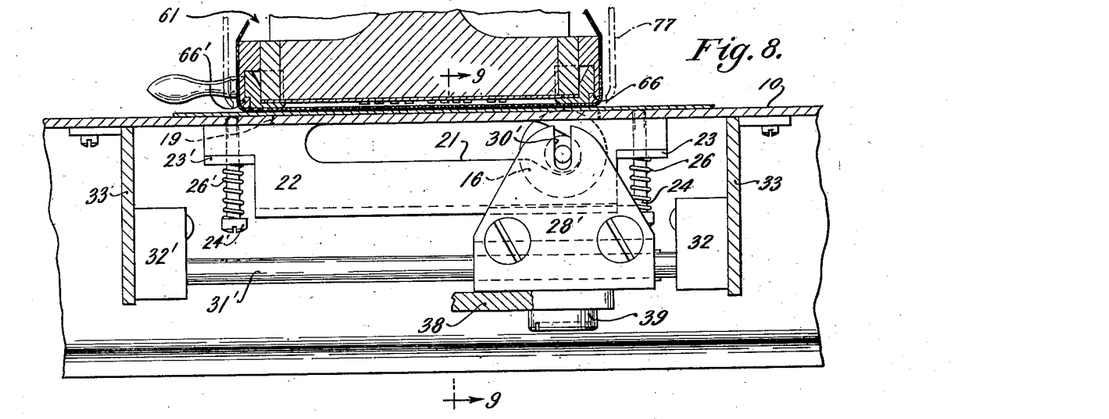
Fig. 8 is a section on the line 8—8 of Fig. 1.

In using the device with the parts arranged as shown in Fig. 1, the handle 70 may be pulled outwardly to carry the plate-holding portions of the bars 64 and 64' to a plate receiving position substantially as shown in broken lines in this view. As these bars arrive at this position the rigid connecting member or strap 72 is brought against the adjustable abutment screws 74 and 74', thus definitely locating the bars in position to receive a plate. A plate may then be placed in position merely by dropping it upon the bars approximately in its intended location, as it is assured that the beveled edges 69 and 69' and also the inclined abutments or ramps 68 and 68' will cooperate to direct this plate into the depressions 67 formed in the bars. As these depressions conform to the contour of the end portions of the plate and have a thickness substantially corresponding to that of the portion of the plate to be received, it will be evident that as the handle 70 is pushed inwardly to the position shown in full lines in Fig 1, the plate will be carried by the bars to a position beneath and substantially against the flat under surface of this end of the superposed frame which therefore constitutes a fixed head adapted to cooperate with the bars for supporting the plate during printing.

The ribbon from the ribbon feeding mechanism passes outwardly over the sides of the frame and across the under side of the bars and therefore is not affected by movement of these bars in transferring the plate from its printing position to a position in which it may be inserted or removed. The material guides 81 and 84 and 84' are then adjusted to a position to hold material to be printed in the desired location with respect to the printing plate and as a piece of such material is inserted it is deflected downwardly by the curved outer ends of the bars 64 and 64' and passes along the upper surface of the table. On depressing the handle 57 the pressure member or roller is caused to move upwardly through the slot 19 in the table and along the slot 21, thereby applying the pressure against the lower side of the material to be printed and forcing this material upwardly against the ink ribbon and pressing the latter against the raised type of the printing plate to effect the printing operation. It will be noted that the extreme end portions of the slots 21 are inclined downwardly so as to hold the pressure roller below the upper surface of the table 10 at all times except during the printing operation. This assures adequate clearance for insertion and removal of material to be printed.

Figure 9A:
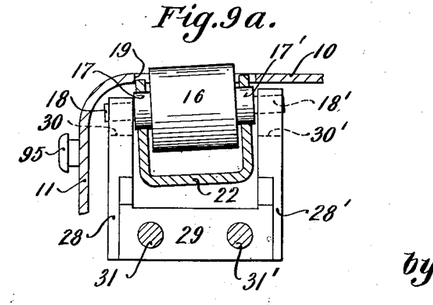
Fig. 9a is a section similar to Fig. 9 showing the parts in different relative positions.
Figure 10:
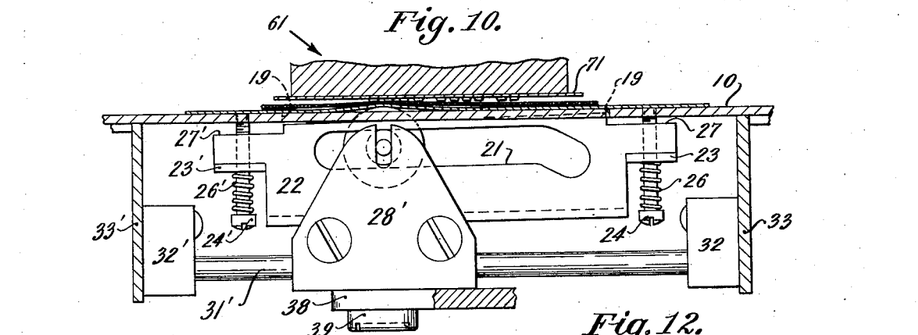
Fig. 10 is a view like Fig. 8, but showing the parts in the act of printing.

As the pressure roller travels along the slot 19 the springs 26 and 26' together with the supporting screws 24 and 24' and the channel member 22 provide a yieldable mounting which permits this roller to back away from the printing surface. Thus the axis of the roller may travel in any straight or irregular path, depending upon the irregularities in the height of the raised type on plate 71 and also upon irregularities in thickness of material to be printed. In some instances this may be sufficient to produce legible and uniform printing, but in the present case it is preferred also to provide for endwise tilting of the roller (Fig. 9a). This is accomplished by spacing the sides of the channel 22 slightly inwardly from the edges of the slot 19. As the holes in the bridge pieces 23 and 23' which receive the screws 24 and 24' are somewhat larger than these screws, sufficient freedom is provided to permit transverse tilting of the channel as well as longitudinal tilting thereof. This arrangement assures that the axis about which the roller tilts endwise will always be in close proximity to the axis of rotation of the roller or to the path of travel of the latter axis. This avoids any tendency for the roller in tilting endwise to wipe or rub the material to be printed transversely of the printing surface in a manner which might otherwise produce indistinct or blurred printing. It will be apparent, however, that should only longitudinal tilting of this channel be desired, this may be provided by spacing the flanges of the channel so that they fit relatively closely along the edges of the slot 19, as in this way the slot may be made to cooperate with the edges of the channel to hold the latter from rocking sidewise and consequently to hold the pressure roller from tilting endwise.

An important feature resides in the arrangement of parts which makes it possible to provide a relatively low and compact apparatus with the actuating means, such as the lever 53, disposed at one side of the unit where an operator may place his hand on this actuating means without at the same time interposing his hand in his normal line of vision of the material to be printed and the material guides 81 and 84 and 84'. Also as the upper housing is relatively low and compact it does not in any way obstruct the operator's view of the material to be printed.

As the actuating lever 53 is depressed the sleeve 48 is turned about the stub shaft and carries with it the crank arm 47 to which the link 46 is pivotally connected. As this link also engages lever 38 the latter is caused to swing about its pivot to move the pusher from the full line position of Fig. 6 to the broken line position, as indicated in this view. When the actuating lever 53 is released the spring 43 becomes effective to return the lever 38 and the pusher 29 to the full line position of Fig. 6. As the shorter arm of the lever 38 and the crank arm 47 are of approximately equal length, it will be seen that the full leverage of the actuating lever 53 is applied about the fulcrum of the lever 38, thus assuring adequate power for easy and yet positive operation of the device and yet making it possible to provide a spring 43 of such strength as to assure a prompt return stroke of the pusher, so that the apparatus may be more instantaneous in operation. It will be evident that by merely removing the pin 56 so as to disconnect the actuating lever 53, the operating mechanism for the pressure roller may be removed as an assembled unit by detaching the screws 90 from the under side of the table.

The device illustrated in Figs. 17 to 23 provides for the use of stencil plates instead of raised-letter printing plates and provides improved means for feeding ink to the ribbon or other ink conveying medium. This device also embodies improvements in mechanical features which make it possible to secure the desired results with a reduced number of parts. This device comprises a table 101 having a depending skirt 102 providing a housing for the lower portion of the apparatus. Within this lower housing a pusher 103 is arranged to cooperate with the journals 18 of a pressure roller 16 in the same manner as described with reference to the device illustrated in Figs. 1 to 16. In this modified construction, however, the pusher 103 is provided with a flat upper surface 104 which is slidably disposed against the flat under surface of the table portion 101. A rack 106 is formed as a unit with the pusher and arranged to extend longitudinally of the latter. A shaft 107 is rotatably mounted in suitable bearings 108 and 109 which are carried by the depending skirt portions 102. A segment gear 111 is fixed upon this shaft 107 with the teeth of the segment meshing with the teeth of the rack 106. This construction and arrangement provides for maintaining the pusher disposed against the under surface of the table portion 101 and also for reciprocating the pusher as the shaft 107 is oscillated. It will be seen, therefore, that this improved construction makes it possible to support the pusher through the engagement of the gear segment 111 with the rack 106 and thus to reduce the number of parts by eliminating the necessity for supporting members such as the rods 31' of the device illustrated in Figs. 1 to 16. The shaft 107 also carries a gear segment 112 which meshes with the gear segment 113 formed on the operating handle 114. This handle is mounted to pivot on a pivot screw 115 secured to a fixed part of the frame. A retracting spring 116 is secured to a bracket 117 on a skirt portion 102 and to an arm 118 secured to the shaft 107 in proper angular relation so that the spring 116 may be effective for causing the shaft 107 to turn in a counterclockwise direction so as to return the parts to their initial positions after the handle 114 has been depressed.

Figures 19, 21:
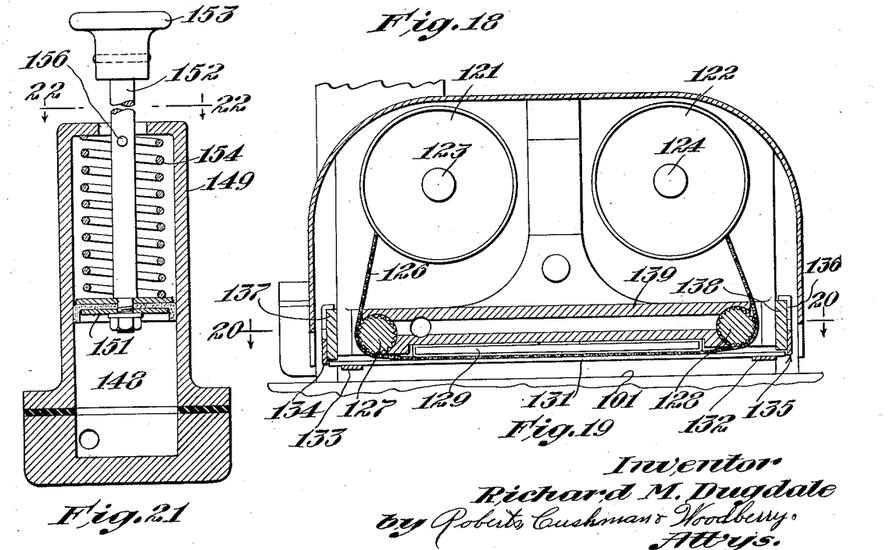
Fig. 19 is a sectional elevation similar to Fig. 8 but illustrating the ribbon feeding and stenciling mechanism of the machine shown in Figs. 17 and 18.
Fig. 21 is a vertical sectional elevation through the ink reservoir illustrated in Figs. 17 and 18.
Figures 20, 22, 23:
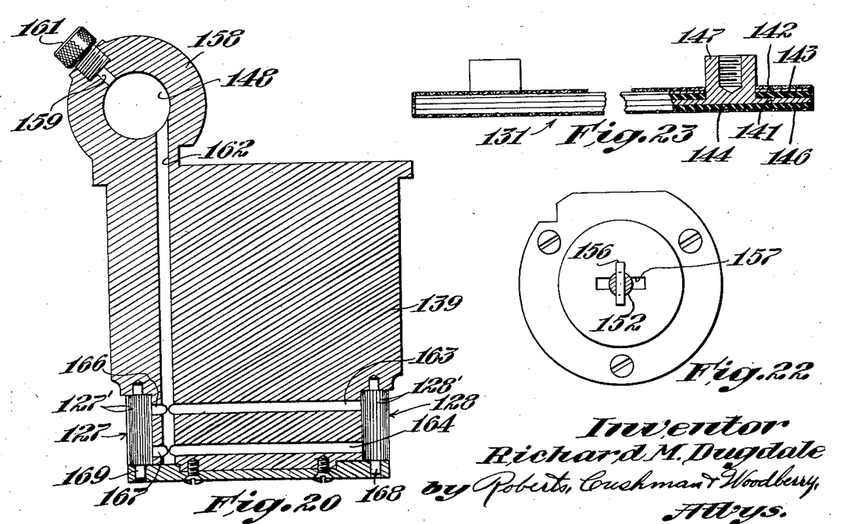
Fig. 20 is a section along the line 20—20 of Fig. 19.
Fig. 22 is a section along the line 22—22 of Fig. 21.
Fig. 23 is an enlarged sectional view of the cushion or pad illustrated in Fig. 19.

The ribbon feeding and stenciling mechanism illustrated in Figs. 19 and 23 comprises ribbon spools 121, 122 mounted upon shafts 123 and 124, the latter preferably being adapted for automatic operation by suitable mechanism (not shown) for feeding the ribbon in timed relation with the operation of the handle 114 so that ribbon is wound from one spool to the other and then the process is reversed. The ribbon 126 passes downwardly from the spools and over rotary elements in the form of rollers or cylinders 127, 128. The ribbon extends in a substantially horizontal run between the cylinders 127, 128 below a yieldable pad 129 and above a stencil plate 131. This stencil plate may be of any approved form such as a member comprising a cardboard frame having a window covered with stencil material which is cut out to form the desired characters. The stencil plate 131 is supported upon the bars 132, 133 of a slide 135 comprising spaced longitudinal elements 134, 136, which are slidably supported upon stationary frame elements 137, 138. It will be understood that this construction provides for withdrawing the stencil supporting slide 135 to one side of the ribbon 126 or of the superposed frame part or head 139 to facilitate insertion and removal of the stencil plates.

The yieldable pad 129 (Figs. 19 and 23) comprises spaced layers of sheet metal 141, 142, a layer of rubber 143 being interposed between the metal layers 141 and 142, and a layer of rubber 144 being disposed on the lower side of the plate 141. These superposed layers of rubber and metal are then covered with a layer of fabric 146. The plate is secured in a recess in the head or frame part 139 by attaching elements such as screws (not shown) which fit into threaded openings in bosses 147 secured to one of the metal strips, as to the strip 141.

In apparatus of the type illustrated in Fig. 19, it is preferred to use a comparatively thick ink of the kind commonly employed for stamping, embossing or stenciling and characterized by being relatively plastic as distinguished from a fluid or self-flowing ink. The improved means for feeding ink of this type to the ribbon 126, comprises an ink supply chamber or reservoir 148 formed in the lower end of a cylinder 149 (Fig. 21). A plunger 151 is fitted in this cylinder and secured to a plunger rod 152 which extends through the head of the cylinder 149 and carries an operating handle or knob 153. A spring 154 is disposed about the rod 152 and extends between the plunger 151 and the head of the cylinder so as to tend normally to exert a downward pressure upon the plunger 151. A transverse pin 156 is secured in the rod 152 and from Fig. 22 it will be seen that the upper end of the cylinder 149 has a slot 157 of a length to permit the pin 156 to pass therethrough when the rod 152 is rotated to bring the pin into alignment with the slot. When this pin 156 is within the cylinder and disposed transversely of the slot 157, it functions to limit upward movement of the rod 152 and the plunger 151, but by rotating the rod 152 the pin 156 may be moved vertically through the slot 157 to raise the plunger 151 to any desired position. This feature is useful when the chamber 148 is to be charged with ink as it relieves all pressure from the body of ink within the chamber 148. The base of the cylinder 149 has a radial flange which is mounted upon the laterally extending portion 158 of the frame part 139 or head 139. This lower portion 158 provides a continuation of the chamber 148 and has a charging opening 159 which is adapted to be closed by a plug 161. It will be understood that ink is supplied to the reservoir through the opening or port 159 when the plunger 151 is held at the desired elevation.

Means for feeding or delivering ink from the chamber 148 to the ink ribbon 126 comprises a longitudinal passage 162 (Fig. 20) which extends between the chamber 148 and the forward side of the frame part 139. Passages 163 and 164 extend between the passage 162 and the roller or cylinder 128, while the passages 166 and 167 extend between the passage 162 and the roller 127. Preferably these rollers or cylinders are rotatably mounted on axles 168 and 169 supported by the head 139. It is also preferred that the periphery of the rollers 127 and 128 should have depressions such as those formed by longitudinal grooves 127' and 128' formed on these rollers.

In the operation of this ink feeding mechanism a body of ink is maintained under resilient pressure within the chamber 148 due to the action of spring 154. This causes the ink to be translated through the passage 162 and the passages 163 to 167 which terminate on the surfaces of the rollers 127 and 128. These rollers, therefore, sustain the pressure produced by the spring 154 but as the ribbon 126 is advanced, preferably with a step-by-step motion, the rollers 127 and 128 are rotated and this rotary movement carries away ink from the feeding passages 163 to 167 and it will be evident that as each roller travels through 180° new ink will be carried by the surface of the roller to the ribbon.

From the foregoing it will be seen that the frame part or head 139 (Fig. 19) and the table portion 101 constitute opposed members having a space therebetween to receive the sheet or other material to be printed, the plate 131 being supported in this space adjacent the head 139 by the slide 135. The pressure roller 16 and its associated operating mechanism serve for progressively compressing together successive opposed areas of the material to be printed and the plate 131. Features of construction not referred to with reference to Figs. 17 to 23 are substantially the same as described with reference to the construction illustrated in the preceeding views.

It should be understood that the present disclosure is for the purpose of illustration only and that this invention includes all modifications and equivalents which fall within the scope of the appended claims.

I claim:

1. A device of the class described comprising two opposed members with a space therebetween to receive the sheet to be printed, one of the members having means for supporting an ink ribbon with one side thereof presented to said space and means for supporting a stencil plate adjacent said side, and means on the other member for progressively rolling said sheet against said stencil thereby compressing successive portions of the sheet, plate and ribbon together to transfer ink from the ribbon through the stencil to the sheet.

2. A device of the class described comprising two opposed members with a space therebetween to receive the sheet to be printed, one of the members having means for supporting an ink ribbon with one side thereof presented to said space, means for supporting a stencil plate adjacent said side, the latter means being movable for transferring said plate to a position to one side of said ribbon to provide for insertion and removal of said plate, and means on the other member for progressively rolling said sheet against said stencil thereby compressing successive portions of the sheet, plate and ribbon together to transfer ink from the ribbon through the stencil to the sheet.

3. A device of the class described comprising two opposed members with a space therebetween to receive the sheet to be printed, means for supporting an ink ribbon adjacent one of said members with one side of the ribbon presented to said space, means for supporting a stencil plate adjacent said side, the latter means being movable for transferring said plate to a position to one side of the ribbon to provide for insertion and removal of said plate, and means on the other member for progressively rolling said sheet against said stencil thereby compressing successive portions of the sheet, plate and ribbon together to transfer ink from the ribbon through the stencil to the sheet.

4. A device of the class described comprising two opposed members with a space therebetween to receive the sheet to be printed, one of the members having means for supporting an ink ribbon with one side thereof presented to said space, means for supporting a stencil plate adjacent said side, and means on the other member for progressively rolling said sheet against said stencil thereby compressing successive portions of the sheet, plate and ribbon together to transfer ink from the ribbon through the stencil to the sheet.

5. A device of the class described comprising two opposed members with a space therebetween to receive the sheet to be printed, means on one of the members for supporting an ink ribbon with one side thereof presented to said space, means on said one of the members for supporting a stencil plate adjacent said side, and means on the other member for progressively rolling said sheet against said stencil thereby compressing successive portions of the sheet, plate and ribbon together to transfer ink from the ribbon through the stencil to the sheet, said plate supporting means being movable for transferring said plate to a position to one side of said one of said members to provide for insertion and removal of said plate.

6. In a device of the class described, the combination of a member having an opening therein, means for supporting a plate on one side of the opening, a pressure roller on the other side of the member, means for guiding the pressure roller for movement in and along the opening, journals on the ends of the roller, a pusher slidably disposed against the latter side of the member, means on the pusher engaging the journals, a rack on the pusher, a gear segment disposed on the latter side of the member and meshing with the rack, and means for supporting the gear segment for oscillatory motion so that this gear segment may be effective through the rack for holding the pusher against the member and also for reciprocating the pusher.

7. In a device of the class described, the combination of means for supporting a plate in position for printing, a pressure roller, means for causing the pressure roller to travel across the plate, means providing for tilting of the roller about an axis spaced from and disposed transversely of the axis of rotation of the roller, and yieldable means tending to maintain the roller surface in substantially parallel relation with the printing surface of the plate.

8. In a device of the class described, the combination of means for supporting a plate in position for printing, a pressure roller, means for causing the pressure roller to travel across the plate, means for maintaining the axis of rotation of the roller substantially normal to the direction of travel thereof, means providing for tilting of the roller about an axis spaced from and disposed transversely of the axis of rotation thereof, and means yieldingly urging the roller toward the printing surface of the plate, whereby a substantially uniform impression may be obtained.

9. In a device of the class described, the combination of means for supporting a plate in position for printing, a pressure roller, means for causing the pressure roller to travel across the plate, means providing for bodily movement of the roller toward and from the plate during travel of the roller thereacross and for urging the roller toward the plate during such travel, means for maintaining the axis of rotation of the roller substantially normal to the direction of travel thereof, and means providing for tilting of the roller about an axis spaced from and disposed transversely of the axis of rotation thereof and relatively close to the latter axis.

10. In a device of the class described, the combination of means for supporting a plate in position for printing, a pressure roller, means for causing the pressure roller to travel across the plate, roller guide means tiltable about different axes approximately parallel to the direction of travel of the roller, and means tending to urge the roller toward the printing surface of the plate.

11. In a device of the class described, the combination of means for supporting a plate in position for printing, a pressure roller, journals on the ends of the roller, guide members having slots therein receiving the journals of the roller, means for supporting the guide members for movement toward and from the plate, means for urging the guideways toward the plate, other members having slots therein receiving the journals of the roller and extending toward the plate, and means for moving the latter members along the guide members to cause the roller to travel across the plate, whereby the axis of the roller may be maintained substantially normal to the direction of travel thereof and the roller may partake of bodily movement toward and from the plate.

12. In a device of the class described, the combination of a table having a slot therein, means for supporting a printing plate above the slot in position for printing, a pressure roller, and means for supporting the roller below the table for movement along and through the slot in the table, whereby material to be printed may be laid on the table under the plate and pressed upwardly against the plate.

13. In a device of the class described, the combination of a table having a slot therein, means for supporting a printing plate above the slot in position for printing, a pressure roller, means for supporting the roller below the table for movement along and through the slot in the table, and means for yieldingly urging the roller upwardly through this slot during travel of the roller therealong, whereby the roller may adjust its position automatically to produce a substantially uniform pressure across the printing surface of the plate.

14. In a device of the class described, the combination of a table having a slot therein, means for supporting a printing plate above the slot in position for printing, a pressure roller, means for supporting the roller below the table for movement along and through the slot in the table, means for urging the roller upwardly through this slot during travel of the roller therealong, and means providing for endwise tilting movement of the roller toward and from the plate, whereby the roller may adjust its position automatically to produce a substantially uniform pressure across the printing surface of the plate.

15. In a device of the class described, the combination of a table having a slot therein, means for supporting a printing plate above the slot in position for printing, a pressure roller, means for supporting the roller below the table for movement along and through the slot in the table, means for urging the roller upwardly through the slot during travel of the roller therealong, means providing for endwise tilting of the roller, and means providing for bodily movement of the roller toward and from the plate, whereby the roller may adjust its position automatically to produce a substantially uniform pressure across the printing surface of the plate.

16. In a device of the class described, the combination of a table having a slot therein, means for supporting a printing plate above the slot in position for printing, a pressure roller under the table, means for moving the roller into and along the slot and back to a position below the upper surface of the table, and means for supporting the roller for relative movement through the slot toward and from the plate during travel of the roller, whereby the roller may adjust its position automatically to produce a substantially uniform pressure on the plate along the path of travel of the roller.

17. In a device of the class described, the combination of a table having a slot therein, a relatively fixed head disposed above the slot, means for supporting a plate for movement from a position to one side of the head to a position beneath and substantially against the under surface thereof, the plate when in the latter position overlying the slot, a pressure roller, and means for supporting the roller below the table for movement in and along the slot.

18. In a device of the class described, the combination of a table having a slot therein, a relatively fixed head disposed above the slot, means for supporting a plate for movement from a position to one side of the head to a position beneath and substantially against the under surface thereof, the plate when in the latter position overlying the slot, a pressure roller, means for supporting the roller below the table for movement in and along the slot and for yielding movement toward and from the head during travel of the roller, whereby the roller may adjust its position automatically to produce a more uniform pressure across the printing surface of the plate.

19. In a device of the class described, the combination of a member having an opening therein, means for supporting a printing plate on one side of the opening in position for printing, a channel on the other side of said member with its flanges disposed along the edges of the opening, a pressure roller disposed transversely between the flanges of the channel, the flanges having guideways for guiding the roller in and along the opening, and means for supporting the channel for movement toward and from the plate and for urging the channel toward the plate.

20. In a device of the class described, the combination of a member having an opening therein, means for supporting a printing plate on one side of the opening in position for printing, a channel on the other side of the member facing the opening with the flanges thereof disposed along the edges of the opening, a pressure roller disposed transversely between the flanges of the channel, the flanges having guideways for guiding the roller in and along the opening, and independent means for yieldably supporting the end portions of the channel for bodily movement toward and from the plate.

21. In a device of the class described, the combination of a member having an opening therein, means for supporting a printing plate at one side of the opening in position for printing, a channel on the other side of the member with the flanges thereof disposed along and receivable between the edges of the opening, a pressure roller disposed transversely between the flanges of the channel, journals on the ends of the roller, the channel flanges having longitudinally disposed guide slots through which the journals project and by which the roller is guided for movement in and along the opening in the member, means for supporting the channel for movement toward and from the printing plate and for urging the channel toward the plate, and means engageable with the projecting journals and movable along the channel for causing the roller to travel along the opening in the member.

22. In a device of the class described, the combination of a member having a slot therein, means for supporting a printing plate on one side of the slot in position for printing, a channel facing the slot with the flanges thereof disposed along and receivable between the edges of the slot, a pressure roller disposed transversely between the flanges of the channel, journals on the ends of the roller, the channel flanges having longitudinally disposed guide slots through which the journals project and by which the roller is guided for movement in and along the slot in the member, means for supporting the channel for movement toward and from the printing plate and for urging the channel toward the plate, a pusher disposed adjacent the channel and comprising members embracing the flanges of the channel and having slots receiving the projecting journals, and means for supporting the pusher for movement along the channel, whereby the roller may be caused to travel in and along the slot in the member.

24. In a device of the class described, the combination of a member having an opening therein, means for supporting a printing plate on one side of the opening in position for printing, a pressure roller on the other side of the member, means for guiding the pressure roller for movement in and along the opening, journals on the ends of the roller, a pusher on the latter side of said member, means on the pusher engaging the journals, a removable frame attached to the latter side of said member, and means carried by this frame for supporting the pusher for movement along the opening in said member, whereby the pusher may be operated to cause the roller to travel along the opening and the pusher and the removable frame may be removed as a unit.

24. In a device of the class described, the combination of a table having a slot therein, means for supporting a printing plate above the slot in position for printing, a pressure roller below the table, means for guiding the pressure roller for movement in and along the slot, journals on the ends of the roller, a pusher below the table, means on the pusher engaging the journals, a removable frame attached to the under side of the table, means carried by this frame for supporting the pusher for movement along and beneath the slot in the table, operating means carried by the removable frame for causing the pusher to traverse its supporting means beneath the slot, whereby the pusher may be effective for causing the roller to travel along the slot and the pusher and the operating means therefore may be removable on the removable frame as an assembled unit.

25. In a device of the class described, the combination of a table having a slot therein, means for supporting a printing plate above the slot in position for printing, a pressure roller below the table, means for guiding the pressure roller for movement in and along the slot, journals on the ends of the roller, a pusher below the table, means on the pusher engaging the journals, a removable frame attached to the under side of the table, means carried by this frame for supporting the pusher for movement along and beneath the slot, a lever mounted to pivot on the removable frame and connected to the pusher for operating the latter, and a spring connected to the lever and to the removable frame for normally holding the pusher at one end of the slot in the table.

26. In a device of the class described, the combination of a member having a slot therein, means for supporting a printing plate on one side of the slot in position for printing, a pressure roller on the other side of said member, means for guiding the pressure roller for movement in and along the slot, journals on the ends of the roller, a pusher on the latter side of said member, means on the pusher engaging the journals, a removable frame attached to the latter side of said member, means carried by this frame for supporting the pusher for movement along and adjacent the slot, a lever mounted to pivot on the removable frame and connected to the pusher for operating the latter, a crank arm, means for rotatably supporting the crank arm from the removable frame, means connecting the crank to the lever, and actuating means for crank arm.

27. In a device of the class described, the combination of a member having an opening therein, means for supporting a printing plate on one side of the opening in position for printing, a pressure roller on the other side of said member, means for guiding the pressure roller for movement in and along the opening, journals on the ends of the roller, a pusher on the latter side of said member, means on the pusher engaging the journals, a removable frame attached to the latter side of said member, means carried by this frame for supporting the pusher for movement along the slot, a lever mounted to pivot on the removable frame and connected to the pusher for operating the latter, a shaft mounted upon the removable frame, a crank arm rotatably supported by this shaft, means connecting the crank arm to the lever, and means for actuating the crank arm.

28. In a device of the class described, the combination of a member having an opening therein, means for supporting a printing plate on one side of the opening in position for printing, a pressure roller on the other side of said member, means for guiding the pressure roller for movement in and along the opening, journals on the ends of the roller, a pusher on the latter side of said member, means on the pusher engaging the journals, a removable frame attached to the latter side of said member, means carried by this frame for supporting the pusher for movement along the opening, a lever mounted to pivot on the removable frame and connected to the pusher for operating the latter, a crank arm rotatably supported on the removable frame in a position above and to one side of the free end of the lever, a link pivotally connected to the crank arm and having a slot freely receiving the end of the lever so that this link may be readily disconnected upon removal of the crank arm, and actuating means for the crank arm.

29. In a device of the class described, the combination of a member having an opening therein, means for supporting a printing plate on one side of the opening in position for printing, a pressure roller on the other side of said member, means for guiding the pressure roller for movement in and along the opening, journals on the ends of the roller, a pusher on the latter side of said member, means on the pusher engaging the journals, a removable frame attached to the latter side of said member, means carried by this frame for supporting the pusher for movement along the opening, a lever mounted to pivot on the removable frame and connected to the pusher for operating the latter, a stub shaft mounted on the removable frame in a position to one side of and above the free end of the lever, and an operating lever fast to the outer end of the sleeve and extending to said one side of said member.

30. A device of the class described comprising a table having a slot therein, a pressure member below the table, a frame mounted on the upper side of the table, a fixed head carried by the frame and spaced above the slot, means for holding a printing plate under the head and above the slot, and means for raising the pressure member in the slot for applying pressure to the plate for printing.

31. A device of the class described comprising a table having a slot therein, a pressure member below the table, a frame mounted on the upper side of the table, a fixed head carried by the frame and spaced above the slot, substantially parallel bars mounted to slide along the under side of the head and spaced for supporting a printing plate, means carried by the bars for holding a printing plate from movement longitudinally thereof, the bars being movable from a position at one side of the head for receiving a plate to a position beneath the head wherein a plate carried thereby is disposed substantially against the head and above the slot in position for printing.

32. A device of the class described comprising a table having a slot therein, a pressure member below the table, a frame mounted on the upper side of the table, a fixed head carried by the frame and spaced above the slot, substantially parallel bars mounted to slide along the under side of the head and spaced for supporting a printing plate, the bars having depressions therein substantially corresponding to the contour of the edge portions of the plate to be received, these depressions being of a depth substantially corresponding to the thickness of the plate so that the latter may have its upper surface substantially coplanar with the upper surface of the bars for engagement with the under surface of the head during printing, the bars being movable from a position for supporting the plate beneath the head in position for printing to a position wherein the plate is disposed to one side of the head.

33. A device of the class described comprising a table having a slot therein, a pressure member below the table, a frame mounted on the upper side of the table, a fixed head carried by the frame and spaced above the slot, substantially parallel bars mounted to slide along the under side of the head and spaced for supporting a printing plate, means carried by the bars for holding a plate in position thereon, other means for directing a plate into engagement with the holding means, the bars being movable from a plate receiving position at one side of the head to a position beneath the head wherein a plate carried thereby is disposed substantially against the head and above the slot in position for printing.

34. In a device of the class described, the combination of a relatively fixed head, substantially parallel bars mounted to slide along the under side of the head and spaced for supporting a printing plate, the bars having depressions to receive and to fit about edge portions of a plate, the bars also having surfaces inclining downwardly toward the depressions for directing a plate therein, the bars being movable from a plate receiving position at one side of the head to a position beneath the head wherein a plate carried thereby is disposed substantially against the under surface of the head in position for printing.

35. A device of the class described comprising a table having a slot therein, a pressure member below the table and operable in the slot, a frame mounted on the upper side of the table, a fixed head carried by the frame and spaced above the slot, substantially parallel bars mounted to slide along the under side of the head and spaced from each other and above the slot for supporting a printing plate, means carried by the bars for retaining a plate in position thereon, the bars being movable between a position wherein the plate carrying portions thereof are disposed at one side of the head and a position wherein these portions are beneath the head, these bars also extending on the other side of the head, and a rigid connection between the bars on the latter side of the head.

36. A device of the class described comprising a table having a slot therein, a pressure member below the table and operable in the slot, a frame mounted on the upper side of the table, a fixed head carried by the frame and spaced above the slot, substantially parallel bars mounted to slide along the under side of the head and spaced from each other and above the slot for supporting a printing plate, means carried by the bars for retaining a plate in position thereon, the bars being movable between a position wherein the plate carrying portions thereof are disposed at one side of the head and a position wherein these portions are beneath the head, these bars also extending on the other side of the head, a rigid member extending across the frame on the latter side of the head and secured to the bars for assisting in stiffening the bars and in maintaining the latter parallel, and means providing a bearing on the upper side of the frame along which this rigid member may ride.

37. A device of the class described comprising a table having a slot therein, a pressure member below the table and operable in the slot, a frame mounted on the upper side of the table, a fixed head carried by the frame and spaced above the slot, substantially parallel bars mounted to slide along the under side of the head and spaced from each other and above the slot for supporting a printing plate, means carried by the bars for retaining a plate in position thereon, the bars being movable between a position wherein the plate carrying portions thereof are disposed at one side of the head and a position wherein these portions are beneath the head, these bars also extending on the other side of the head, a rigid connection between the bars on the latter side of the head, and ribbon feeding mechanism disposed on the upper side of the head.

38. In a device of the class described, the combination of a relatively low housing comprising a table portion and a skirt depending from the outer edges of the table portion, the latter having a slot adjacent one side thereof, a pressure member below the table portion and operable in the slot, actuating means disposed adjacent the skirt at the side of the table portion opposite the slot, operating means interposed between the actuating means and the pressure member, the operating means being disposed within the skirt and below the table portion, and means mounted on the upper side of the table portion for holding a printing plate above the slot in position for printing.

39. In a device of the class described, the combination of a relatively low housing comprising a table portion and a skirt depending from the outer edges of the table portion, the latter having a slot adjacent one side thereof, a pressure member below the table portion and operable in the slot, actuating means disposed adjacent the skirt at the more remote side of the table portion opposite the slot, operating means interposed between the actuating means and the pressure member, a removable frame carrying the operating means as an assembled unit, the removable frame being mounted within the skirt and below the table portion, and means mounted on the upper side of the table portion for holding a printing plate above the slot in position for printing.

40. In a device of the class described, the combination of a relatively low housing comprising a table portion and a skirt depending from the outer edges of the table portion, the latter having a slot adjacent one side thereof, a pressure member below the table portion and operable in the slot, actuating means disposed adjacent the skirt at the side of the table portion opposite the slot, operating means interposed between the actuating means and the pressure member, the operating means being disposed within the skirt and below the table portion, a relatively low frame disposed centrally of the table portion and extending on the upper side thereof between the slot and the actuating means, a fixed head carried by this frame and disposed above the slot, and movable means for holding a printing plate substantially against the under side of the head.

41. In a device of the class described, the combination of a relatively low housing comprising a table portion and a skirt depending from the outer edges of the table portion, the latter having a slot adjacent one side thereof, a pressure member below the table portion and operable in the slot, actuating means disposed adjacent the skirt at the side of the table portion opposite the slot, operating means interposed between the actuating means and the pressure member, the operating means being disposed within the skirt and below the table portion, a relatively low frame disposed centrally of the table portion and extending on the upper side thereof between the slot and the actuating means, a fixed head carried by an end portion of this frame and disposed above the slot, ribbon feeding means mounted on the upper side of the fixed head, bars mounted to slide on this head for carrying a plate substantially against the under side thereof, a rigid connection between the bars, means on the frame providing a guideway along which the connection may slide during movement of the bars, and a relatively low housing enclosing the frame and parts associated therewith.

42. In a device of the class described, the combination of a relatively low housing comprising a table portion and a skirt depending from the outer edges of the table portion, the latter having a slot adjacent one side thereof, a pressure member below the table portion and operable in the slot, actuating means disposed adjacent the skirt at the more remote side of the table portion opposite the slot, operating means interposed between the actuating means and the pressure member, the operating means being disposed below the table portion, a relatively low frame extending transversely across the upper side of the table portion between the slot and the actuating means, a fixed head carried by this frame and disposed above the slot, ribbon feeding mechanism mounted on the upper side of the head, movable means associated with the head and having a bearing on the frame for carrying a plate substantially against the under side of the head, a relatively low housing enclosing the frame, and material guides slidable along opposite sides of the frame and projecting outwardly beneath the housing.

43. A device of the class described comprising a housing having a substantially flat upper surface, this surface having a slot therethrough, a pressure member disposed below the housing and operable in the slot, a relatively fixed head disposed above the slot, a plate holder mounted to slide along the head for carrying a printing plate from a printing position beneath the head to a transfer position at one side thereof, a shelf, and means for detachably supporting the shelf on the housing with the upper surfaces of these members substantially coplanar, the shelf having a hand hole disposed to lie beneath the outer edge of a printing plate disposed in the plate holder when the latter occupies the transfer position at one side of the head, whereby the hand hole may provide space for the fingers of a person inserting or removing a plate.

44. In a device of the class described, the combination of a table having a slot therein, means for supporting a printing plate above the slot in position for printing, said means being supported by the table at one side only with the other three sides unobstructed to receive a sheet of paper between the plate and the table, a pressure roller, and means for supporting the roller below the table for movement along and through the slot in the table, whereby material to be printed may be laid on the table under the plate and pressed upwardly against the plate.

45. In a device of the class described, the combination of a table having a slot therein, means for supporting a printing plate above the slot in position for printing, said means being supported by the table at one side with the opposite side suspended above the table to receive a sheet of paper between the plate and the table from the latter side, a pressure roller, and means for supporting the roller below the table for movement along and through the slot in the table, whereby material to be printed may be laid on the table under the plate and pressed upwardly against the plate.

46. In a device of the class described, the combination of a table having a slot therein, a relatively fixed head disposed above the slot, means for supporting a plate for movement from a position to one side of the head to a position beneath and substantially against the under surface thereof, said means when in the former position having its upper side accessible for insertion and removal of such plates and having an opening under the plate through which the paper is printed when in the latter position, the plate when in the latter position overlying the slot, a pressure roller, and means for supporting the roller below the table for movement in and along the slot.

RICHARD M. DUGDALE.